United States Patent [19]
Barrick et al.

[11] Patent Number: 5,361,072
[45] Date of Patent: Nov. 1, 1994

[54] GATED FMCW DF RADAR AND SIGNAL PROCESSING FOR RANGE/DOPPLER/ANGLE DETERMINATION

[75] Inventors: Donald E. Barrick, Redwood City; Belinda J. Lipa, Portola Valley; Peter M. Lilleboe, Los Altos; Jimmy Isaacson, Mountain View, all of Calif.

[73] Assignee: Codar Ocean Sensors, Ltd., Los Altos, Calif.

[21] Appl. No.: 843,183

[22] Filed: Feb. 28, 1992

[51] Int. Cl.$^5$ .......................... G01S 13/08; H01Q 9/16
[52] U.S. Cl. .................................. 342/133; 342/175; 342/196; 343/793
[58] Field of Search ................. 342/432, 13, 107, 133, 342/175, 196; 343/793

[56] References Cited

U.S. PATENT DOCUMENTS

| | | |
|---|---|---|
| 3,882,506 | 5/1975 | Mori et al. |
| 4,053,884 | 10/1977 | Cantrell et al. ..................... 343/17.2 |
| 4,172,255 | 10/1979 | Barrick et al. ........................... 343/5 |
| 4,309,703 | 1/1982 | Blahut ................................ 343/17.2 |
| 4,433,336 | 2/1984 | Carr ..................................... 343/728 |
| 4,896,159 | 1/1990 | Sabatini et al. ...................... 342/131 |
| 5,023,618 | 6/1991 | Reits ..................................... 343/128 |

OTHER PUBLICATIONS

Barrick, D. E., "FM/CW radar signals and digital processing," NOAA Tech. Report ERL 283—WPL 26, U.S. Dept. of Commerce, Boulder, Colo. 1973.

Prandle and Ryder, "Measurement of surface currents in Liverpool Bay by high frequency radar," *Nature*, vol. 315, pp. 128–131, 1985.

Lipa and Barrick, "Least-squares methods for extraction of surface currents from CODAR crossed-loop data," *IEEE J. Oceanic Engr.*, vol. OE-8, pp. 226–253, 1983.

Lipa and Barrick, "Extraction of sea state from HF radar sea echo," *Radio Science*, vol. 21, pp. 81–100, 1986.

*Primary Examiner*—Mark Hellner
*Attorney, Agent, or Firm*—Codar Ocean Sensors, Ltd.

[57] ABSTRACT

A lower-frequency compact radar system for wide-angle surveillance. Direction-finding receive antennas consisting of colocated orthogonal electric and magnetic dipoles provide target angles from the radar. The size of this antenna unit is reduced to the point where internal noise is comparable to external to achieve maximum compactness. High sensitivity is achieved with an efficient class of pulsed/gated, linearly swept-frequency waveforms that are generated and processed digitally. For backscatter radars, close to 50% duty factors are realized. The rules for waveform design and processing overcome problems of range/Doppler aliasing and/or blind zones. After mixing in the receiver, processing bandwidths are much less than RF signal bandwidths, so that simple, inexpensive personal computers are used for real-time signal processing. Digital FFT algorithms determine target range and Doppler, and DF algorithms determine its angles. Frequency hopping can be incorporated in the waveform design by synchronizing all timing and sampling functions, allowing spread-spectrum advantages while still achieving the high sensitivity afforded by coherent processing.

26 Claims, 4 Drawing Sheets

GATED FMCW DF RADAR AND SIGNAL PROCESSING FOR RANGE/DOPPLER/ANGLE DETERMINATION

BACKGROUND 1. Field of Invention

This invention relates to lower-frequency radars (below microwave), and embodies improvements by way of compact electronics and antennas, efficient signal waveforms and their digital generation/processing, and direction-finding (DF) angle measurements.

2. Cross-Reference to Related Applications

| Field of Search | 432/107, 432/131, 432/132, 432/139, 432/195, 432/196 343/726, 342/728, 343/742 | | |
|---|---|---|---|
| U.S. Pat. No. | | | |
| 3,882,506 | 1975 | Mori et al. | 343/728 |
| 4,053,884 | 1977 | Cantrell and Lewis | 432/132 |
| 4,172,255 | 1979 | Barrick and Evans | 432/107 |
| 4,309,703 | 1982 | Blahut | 432/132 |
| 4,433,336 | 1984 | Carr | 343/728 |
| 4,896,159 | 1990 | Sabatini et al. | 432/131 |
| 5,023,618 | 1991 | Reits | 432/196 |

3. Other Publications

Barrick, D. E. (1973), FM/CW radar signals and digital processing, NOAA Tech. Report ERL 283-WPL 26, U.S. Dept. of Commerce, Boulder, Col.

Prandle, D. & D. K. Ryder (1985), Measurement of surface currents in Liverpool Bay by high frequency radar, *Nature*, vol. 315, pp. 128–131.

Lipa, B. J. & D. E. Bartick (1983), Least-squares methods for the extraction of surface currents from CODAR crossed-loop data: Application at ARSLOE, IEEE J. *Oceanic Engr.*, vol. OE-8, pp. 226–253.

Lipa, B. J., & D. E. Barrick (1986), Extraction of sea state from HF radar sea echo: Mathematical theory and modeling, *Radio Sci.*, vol 21, pp. 81–100.

4. Description of Prior Art

Lower-frequency radars operating in the MF, HF, and VHF bands, are useful for a number of applications. Among them are ocean wave and surface current monitoring, as well as detection of discrete targets, e.g., aircraft, ships, misstics, etc. The advantages are: (i) their ability to see beyond the horizon, in both skywave and surface-wave propagation modes; (ii) the comparable size of their wavelength with scattering target dimensions, allowing resonance with the target; and, (iii) lower data rates (resulting from the low frequency) permit easy digital signal generation and processing. The radars considered here operate typically three orders of magnitude lower in frequency than the much more more common microwave radars. Their consequent disadvantages compared to microwave radars have to do primarily with larger antenna sizes required for antenna gains comparable to microwave; their sizes can be larger by as much as three orders of magnitude. Penalties of this antenna size are: (i) they become prohibitively costly or too impractical for most applications; or (ii) if antenna size is reduced, inadequate target detection sensitivity may result when standard radar signal formats are used. In addition, the narrower bandwidth of such radar signals makes them more susceptible to intercept and jamming.

The normal way a microwave radar determines target direction is to form a narrow beam. This is done with an aperture many wavelengths in extent. The beamwidth (in radians) is nearly the wavelength divided by the antenna length. When beam forming is used with HF skywave radars, for example, phased array antennas several kilometers in length are required. Narrow-beam surface-wave radars, such as the British OSCR for ocean current mapping [Prandle and Ryder, 1985] use phased array antennas that require more than 100 meters of lineal coastal access, a frequently impractical constraint. Antennas at HF with sizes the order of a wavelength in extent (e.g., 10–20 meters) have nearly omni-directional patterns, and are considered inadequate for accurate radar angle determination if beam forming and scanning are employed. An alternate way to determine angle is to employ direction-finding (DF) principles, which has not commonly been used with radars. U.S. Pat. Nos. 3,882,506 and 4,433,336 describe hardware implementations of two crossed single-turn air-loops and a monopole all mounted along the same axis. However, these loop antennas are still quite large, e.g., 1–4 meters across at mid-HF; it was believed that the antennas had to be highly efficient to provide adequate sensitivity and angle accuracy. The point being missed was that a receive antenna at lower frequencies does not have to be highly efficient, and therefore be large, in order to provide maximum possible radar sensitivity and accuracy. The reason is that external noise dominates, and the antenna need only possess an efficiency so that external and internal noise are comparable. Any size or cost increase to improve efficiency of the receive antennas beyond this point is wasted. The present invention goes beyond the hardware-only inventions of the above patents by giving algorithms for extracting angles, and allowing for more than three colocated orthogonal elements for radar signal DF.

Since both transmit and receive antenna gains of lower-frequency radars are less, target detection and location accuracy are worse if the same waveforms are used as for microwave radars. Microwave radars use pulse waveforms having low duty factors (the ratio of pulse width to pulse repetition interval), usually 1% or less. To gain back the sensitivity and accuracy lost by antenna size, lower-frequency radars have typically gone to high duty-factor signals. These radars are usually operated against moving targets, and Doppler processing is part of the waveform design and utilization. HF skywave radars, where the transmit and receive sites are separated by tens of kilometers, use 100% duty factor signals, i.e., transmitter and receiver are on all the time. Here the favored waveform has been the simple linearly swept frequency-modulated continuous-wave (FMCW) signal as described by Bartick [1973].

When the transmitter and receiver are colocated, as are in compact backscatter radars at HF, one cannot transmit and receive at the same time because the strong transmit signal overwhelms the receiver. Then the highest possible duty factor is 50%; i.e., the transmitter is turned off while receiving and vice versa. The design of efficient, non-ambiguity-producing waveforms and digital signal processing that combine high (e.g., 50%) duty factor pulsing/gating with modulation formats that give target range, such as linear FMCW, has not yet been successfully implemented. Three periodic processes are happening simultaneously: (i) the modulation used for target range determination, e.g., linear FMCW; (ii) the pulsing/gating process; (iii) the digital sampling occurring in the analog-m-digital (A/D) convertor. Each of these three periodic processes replicates the target echo in the frequency domain, and when all three happen at once, severe aliasing and ambiguities can result. For example, the simple linearly swept FMCW signal starts with a potential range-Doppler ambiguity. Attempting to mitigate this problem for high speed targets can cause Doppler aliasing, i.e., two or more possible choices for Doppler. To overcome this, one would increase the linear sweep repetition frequency, but then range aliasing can occur (two or more possible choices for target range). And the pulse/gate repetition frequency itself—if chosen improperly—can cause both range and Doppler aliasing. Attempts to eliminate the latter by shortening the pulse will either: (i) lower the duty factor, or (ii) result in blind zones, where targets will not be illuminated or seen. Although jittering of any of these repetition rates—as well as the frequency itself—can unravel the ambiguities and eliminate blind spots, these inelegant solutions add complexity and can make Doppler processing very difficult. Examples are U.S. Patent Nos. 4,896,159; 4,309,703; and 4,053,884.

Another disadvantage of conventional pulse-Doppler or chirp waveforms with time-domain pulse compression is the high digitizing and data-processing rates required. The A/D must generally sample at least twice the RF bandwidth, this latter bandwidth being dictated by the range resolution desired. Even for lower-frequency radars, the rates required are typically higher than 200 kHz per receiver channel. This precludes use of 16-bit convertors, with resultant limitations on signal dynamic range, and thence clutter and interference rejection. It also rules out use of widely available, commercial, inexpensive DSP (digital-signal-processing) boards.

A third problem with existing pulse radar design is the requirement for STC (sensitivity-time control) circuitry. These active circuits change the gain of the receiver circuits rapidly with time after transmission of each pulse, in order to flatten the dynamic range between very strong close-in clutter echoes and the most distant target echoes. The difference between these echoes can exceed 140 dB, far beyond the range of practical linear receiver operation. STC circuitry increases the cost and complexity of radars considerably, and hence incentive exists to eliminate this function.

It is often desirable to spread the radar signal's spectral energy over a very wide bandwidth. There will be less interference to others, and in military radars, it makes the signal less susceptable to detection/intercept and jamming. In the range-only (no Doppler) 100% duty-factor FMCW radar described in U.S. Pat. No. 5,023,618, this was a primary objective of their signal design and processing. Nevertheless, such FMCW signals, sweeping slowly and repetitively over a moderately wide bandwidth—as well as repetitive pulse signals—are both becoming easier to detect and jam with modern sophisticated military systems. Hence, a signal that can be used with a lower-frequency backscatter radar, provides high sensitivity, range, and Doppler information, avoids aliasing and ambiguities, has much lower digitizing rates than the RF signal bandwidth, and is difficult to intercept and jam, has not yet been implemented. The present invention reveals a waveform design methodology and its digital generation/processing that accomplishes these goals.

OBJECTS AND ADVANTAGES

Accordingly, advantages of the present invention have to do with size and cost reductions, accompanied by sensitivity increases, for lower-frequency radars that determine target range, Doppler, and angles. Several of the objects listed below have to do with the antenna unit, while the remainder relate to the unique waveform and its digital generation and processing. These objects are:

(a) To provide an efficient, nearly omnidirectional transmit antenna element.

(b) To provide a compact set of receive antenna elements whose phase centers are colocated, the elements being orthogonally oriented electrically small loops and monopoles that have patterns of electric and magnetic dipoles, with adequate efficiencies so that external noise is comparable to internal noise.

(c) To provide good receive magnetic dipole efficiency at ultra-small size by employing ferrite-loaded loopstick designs that are electrically isolated from each other and from the other orthogonally oriented elements, as well as from all feedlines.

(d) To provide software methods for DF, i.e., using the antenna outputs to determine the angles to the target.

(e) To provide efficient operation by digitally generating, radiating, and processing a signal whose linearly swept FMCW waveform has a nearly 50% duty factor, but has the ability to:

(i) provide both target range and Doppler with a matched-filter receiver/processor;

(ii) permit much lower data bandwidth and digital processing rate than contained in the RF bandwidth required to achieve the desired range resolution;

(iii) provide the desired range coverage without blind zones;

(iv) taper the energy incident upon and received from targets at different ranges so as to offset the normal rapid echo signal falloff with range, or to achieve any other application-specific distribution of energy with distance;

(v) cover the span of anticipated target ranges and Dopplers without aliasing, ghosting, or other echo ambiguities;

(vi) provide the coherent range and Doppler processing described above, but when desired, employ rapid random frequency hopping to avoid signal intercept or interference to others.

(f) To provide recursive, running averaging of received signal cross spectra in order to identify and/or remove ship echoes or other interference from the sea scatter background.

(g) To provide means for using the echo signals to calibrate for inter-element antenna and receive channel amplitude and phase drifts with time.

(h) To provide a means for determining target angles after detection in range-Doppler space using the signals from the various receive antenna elements, while allowing correction for distorted antenna patterns and coupling among elements that are inevitable in practical situations.

A principal obstacle overcome by the present invention is the signal processing complexities resulting from the gating/pulsing required in the backscatter mode, since the receiver cannot be turned on while the transmit signal is being radiated. The objects here are to reveal a design and implementation methodology that overcomes the difficulties caused by three periodic processes: modulation sweeping that provides range information; gating and pulsing; and digital sampling. Robustness against interference to others and intercept/jamming is provided by inclusion of spread spectrum techniques in the signal design. Another obstacle surmounted here is the requirement for large antennas and/or phased arrays (because of the long wavelength) in order to provide accurate target angles. Still further objects and advantages will become apparent from a consideration of the ensuing description and drawings.

BRIEF DESCRIPTION OF DRAWINGS

The invention will be explained in detail with reference to the accompanying drawings.

FIG. 2 shows the-additional software processing functions that embody the present invention. These begin with the output of the second FFT from FIG. 1 for all three receive antenna channels. Therefore, the functions shown in FIG. 2 are repeated for all three channels (either simultaneously of sequentially), down to the second to last boxes (64 and 78), where signals from the three channels are combined to obtain the angle directions required. The processing channels to the left are representative of embodiments we have used for sea-surface parameter extraction (e.g., current and wave information). The processing channels to the right are embodiments used for hard target detection (e.g., aircraft, missiles, etc.). The diamond boxes in the middle are stored data that are required in the processing.

DESCRIPTION OF PREFERRED EMBODIMENTS

System and Hardware Implementation

Radar System

Figure 1:
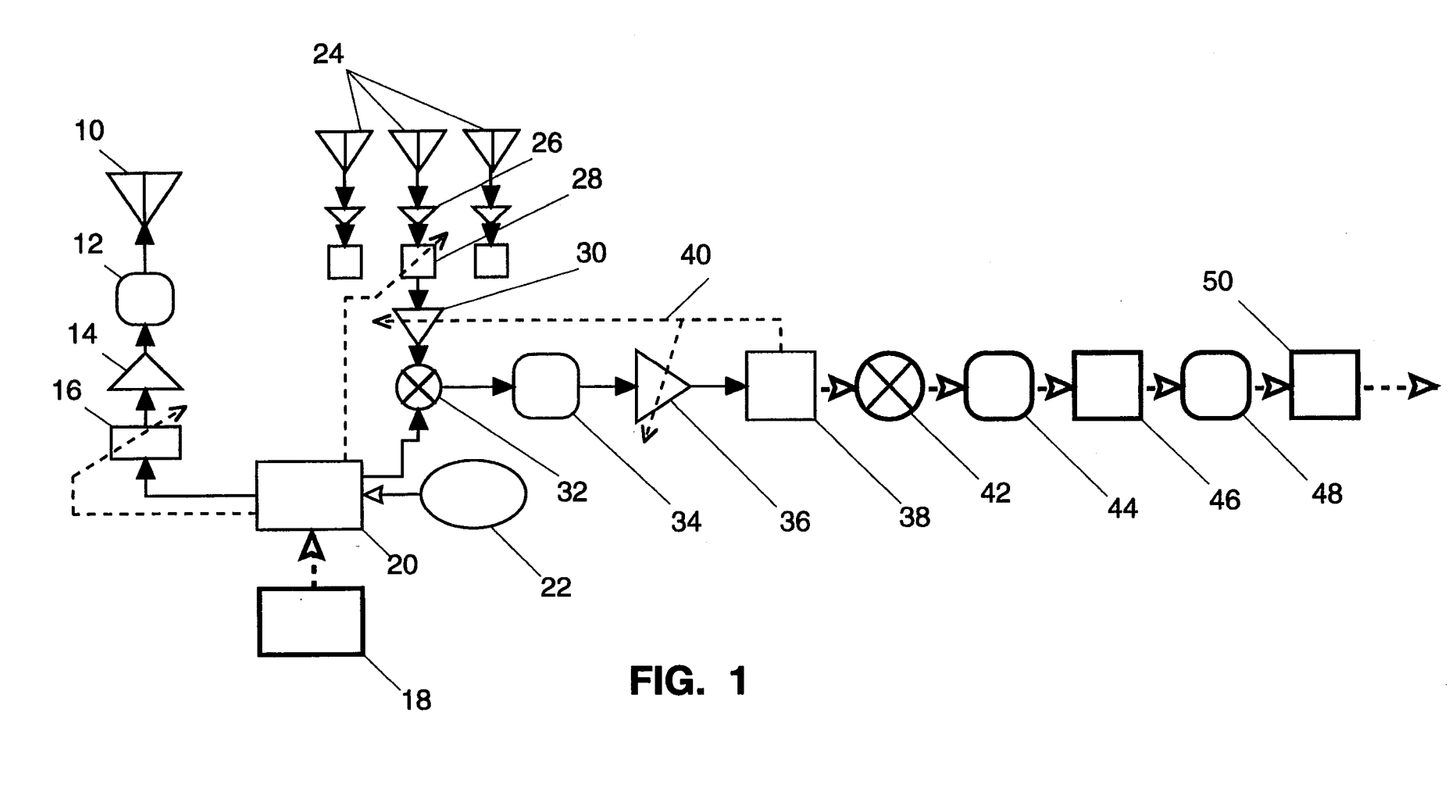
FIG. 1 is block diagram of an embodiment of the present invention including the hardware (at the left, with light lines) and software functions (at the right, with heavy lines). Three receive antenna channels are indicated here, but only one is shown following the gate switch, 28; the other two are identical. Software processing functions are shown through the second FFT, 50, after which both range and Doppler of the target echoes have been obtained.

FIG. 1. A high-duty-factor (approaching 50%) gated FMCW signal is employed. A stored map of the signal parameters to be transmitted and used in the receiver is downloaded to the digital control unit 18 when the radar is started. This map contains all required timing, frequency, gating/pulsing, and A/D sampling information. The actual timing for all of these processes is obtained from the master clock or oscillator 22 through normal digital dividedown counters. The direct digital synthesizer (DDS) 20 then generates the discrete frequencies required of the linear FMCW sweep to be transmitted, as well as that to be fed to the receiver mixer 32 (the latter may be different from that transmitted in order to provide an IF offset in the receiver, if desired).

The linear frequency ramp signals to be transmitted and mixed in the receiver are therefore stair-step frequency-vs-time functions. This means that at given time increments, the frequency of the sinusoid being generated changes, but in a way so that the phase remains continuous at the jump. (This phase continuity is the natural characteristic of DDS chips.) The frequency jump must be less than the frequency increment corresponding to each range cell's spectral spacing; the rules defining the latter are described later. On the transmit side, the RF signal whose frequency is thusly being digitally controlled and swept, is passed to the pulse switch 16. Here, pulsing signals (shown dashed) turn on and off the RF signal before transmission, usually in square-wave fashion, i.e., close to 50% duty factor. The duration for the square wave on/off time is much less than the time required for the FMCW sweep. This is a departure from the normal "chirp" radar signals, where the sweep is completed and repeated every pulse. Power amplifiers 14 (either Class A or C) amplify this signal to its desired level for radiation. The harmonic filter 12 has an adequate low-pass characteristic so as to remove all harmonics of the RF signal frequency, eliminating the possibility of out-of-band interference to others. Finally, the efficient but (nearly) omnidirectional transmit antenna 10 radiates the signal. For example, its pattern might be omni-directional in bearing, as would be obtained from a resonant quarter-wave monopole. Or, it might illuminate a bearing sector 120°, obtainable from a YAGI two-element monopole array. The pattern depends on the radar application, i.e., where one expects to find target echoes.

Three or more colocated receive antennas 24 might pass their signals to preamplifiers 26, which can include some RF bandpass filtering. The purposes of the preamplifiers are to equalize approximately the signals among the various receive channels, and to fix the noise factor for that channel. Often, in the case of the loopstick, the antenna will be capacitively tuned to the frequency band of operation, providing both good matching to the line as well as bandpass filtering that rejects out-of-band signals. Loops are kept electrically small so as to produce "cosine" or figure-8 antenna patterns, as this is useful in the subsequent DF processes. The receive monopole element can also serve as the transmit element, if omni-directional illumination is desired. If this is the case, a preamplifier is normally not needed because of the antenna's higher efficiency; the resonant monopole serves as a natural bandpass filter for out-of-band signal rejection. Next, each receiver channel is gated, i.e., the channel is turned off by the gate switch 28 during transmit pulsing to prevent subsequent receiver overload. Finally, the RF amplifier 30 (which can also include some bandpass filtering) increases all receive signals to the desired level; these amplifiers can include some coarse automatic-gain control (AGC) feedback, so as to keep the signals within desired dynamic range limits.

In a typical embodiment, the receive signals at this point are mixed 32 with a local oscillator signal obtained from the DDS 20. Both contain the linear frequency ramp, and the mixing process removes the ramp and converts to a coherent baseband signal (near-zero IF). This embodiment is called a homodyne process. Because of the time delay from radar targets, the receive signal's frequency is proportional to target range, resulting from the FMCW linear frequency sweep employed. As a result of the sweep, separate I and Q (in-phase and quadrature) channels are not required for coherent Doppler processing. Very strong, close-in clutter signals will appear at or near zero frequency after mixing, while distant target echoes will be offset the most in frequency. This has the advantage that a properly designed, simple high-pass filter 34 can suppress the strong clutter signals significantly, thereby reducing the subsequent dynamic range required. The low-pass filter portion of 34 is meant to cut off at frequencies beyond the limit expected of the most distant target echoes, so as to reject out-of-band noise and interference, thereby ensuring the desired "match-faltering" receiver function. Also, this low-pass filter rejects the sidebands of the periodic pulsing/gating process; the signal beyond this point therefore appears smooth, i.e., its pulsed nature has been removed. Additional baseband amplifiers 36, accompanied in some cases with AGC feedback gain control, serve to stretch the signal span so as to use optimally the dynamic range of the A/D convertor 38. Usually a 12-bit A/D is adequate to handle the signal dynamic range spans encountered (especially when followed by the spectral processing that further extends dynamic range). The bandwidth and data rate through the A/D of this properly designed FMCW receiver are typically orders of magnitude lower than the RF sweep bandwidth required to supply the desired range resolution; this simplifies and reduces costs of the A/D and subsequent digital processing.

Signal levels are checked at the output of the A/D. If any of the three channel's signals (which should be of the same order in magnitude) are too high (tending to saturate the system) or too low (generating unnecessary quantizing noise), AGC feedback signals 40 adjust the gain of both RF and baseband, amplifiers accordingly. Only coarse adjustments (e.g., in 20 dB steps) are required. The output of the A/D for each antenna channel is a real voltage time series, which digitally appears as an array of numbers. This digital time series may require digital mixing 42 and/or digital low-pass filtering followed by decimation, depending on the application and corresponding signal design. At step 44, a multiplicative window/weighting may be applied to the time series array to reduce subsequent spectral sidelobes; the Hamming is one example of a window we use that guarantees −43 dB sidelobes or lower. The length of this time series array is made equal to the frequency sweep repetition interval, and the number of points is selected (by choice of the A/D sampling rate) to be a power of two (take this number to be N), as required by the FFT algorithm. The output of the first FFT 46 is a complex array, of which we retain only the first N/2 points. The signals at each of these points then correspond to radar target echo signals that come from progressively greater ranges. These N/2 complex array points are collected as rows of a matrix every sweep repetition interval until a total of M rows are obtained, over a period of time that corresponds to the reciprocal of the desired Doppler frequency resolution. This time is selected so M is a power of two also. Then another window/weighting vector multiplies each column (or range cell) of this matrix 48, and a second FFT is performed over each column 50. The latter provides Doppler processing for each range cell, and since it operates on a complex input array, the output preserves the sense of Doppler (positive or negative), just as though in-phase and quadrature channels had been used. Normally, we do all of the digital processing steps from 42 to 50 on digital-signal-processing (DSP) boards that are commercially available for use in personal computers or their microprocessor chips; the data rates are generally less than 4096 kHz (or words per channel), so these boards are more than adequate to handle several such antenna channels simultaneously, providing real-time processing. Furthermore, the required FFT and windowing algorithms are generally available from the DSP-board vendors as library call-up functions.

Subsequent Processing

Figure 2:
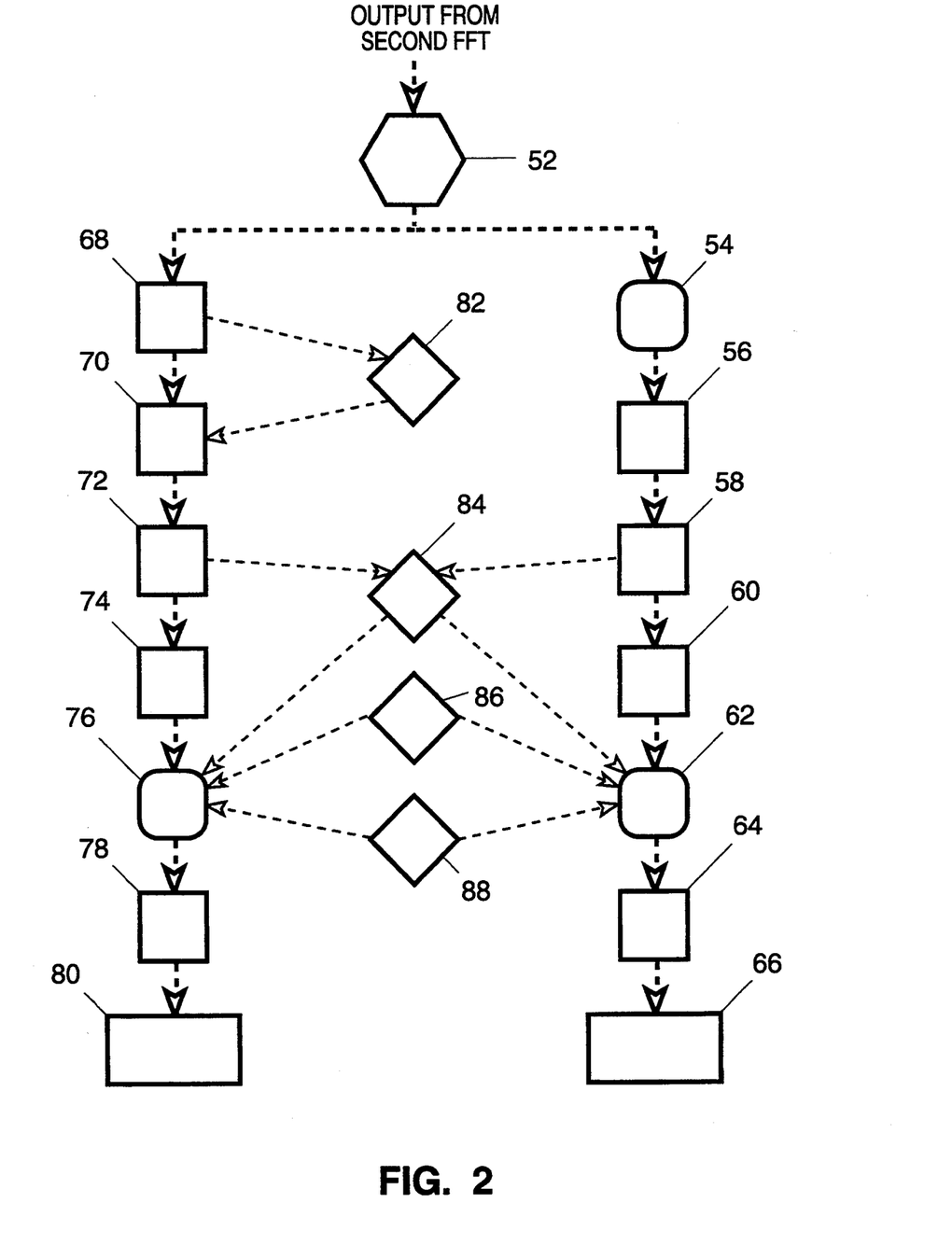

FIG. 2. The top of FIG. 2 is the output of the second FFT. Further digital mixing and/or digital filtering of portions of the range-Doppler cells may be appropriate, and we allow for this possibility in 52. Beyond this point two signal-flow algorithmic paths are shown: (i) to the fight, representing typical embodiments for hard-target detection (e.g., aircraft, missiles, etc.), and (ii) to the left, representing ocean-surface parameter extraction (e.g., currents and waves). Consider the flow to the right first, for hard targets. In 54 and 56, we allow for additional FFF processing to provide multiple coherent integration times. For example, assume the output of the second FFT represents an integration time of 2 seconds (giving a system noise bandwidth of 0.5 Hz). A four-point FFT done on the same range-Doppler cell of four consecutive 2-second runs results in an effective 8-second coherent integration time for that cell, thereby increasing its signal-to-noise (S/N) ratio by 6 dB. Multiple integration times are thereby realized; the shorter provides more rapid updates, while the longer provides higher S/N.

In 58, we allow for the option of measuring antenna channel amplitude and phase calibration factors directly from the (sea) clutter echo. Such methods are described in Lipa and Bartick [1983 and 1986]. These factors correct for mismatches in the channels due to system unknowns and/or gain drifts with time; they are stored 84 for later use or diagnostic messages. The next step involves detection of the target. A standard CFAR threshholding is employed 60, where signals in given range-Doppler cells are flagged as potential targets if they lie a predetermined level (in dB) above the flat noise floor. At this point, the stored amplitude/phase factors—as well as other antenna calibration parameters including mutual impedances 86 and patterns 88—are applied in 64 to determine the angles (e.g., bearing and elevation) to the target, based on the complex signals from the three antenna channels for the signals in the cell containing the flagged target echo. One implementation of this DF algorithm will be discussed subsequently. It is important to note that—unlike normal microwave radars—target bearing is determined here after target detection rather than before. Finally in 66, additional target identification, classification, sorting, and/or tracking algorithms may be employed.

The left-side algorithmic flow of FIG. 2 relates to ocean-surface (e.g., current or wave) measurements made with HF/VHF radars, with the physical principles described in Lipa and Barrick [1983 and 1986]. The first step 68, however, differs from that presented earlier, in that two or more running averages are continuously calculated, rather than one set of averages formed by simply adding J cross spectra and dividing by J. The latter process was done in the past when computers could not acquire and process radar data simultaneously; hence, it was necessary to stop the radar data acquisition while processing a segment of data. Our present invention involves continuous radar data acquisition and, simultaneous processing in a multi-tasking environment, and hence, continuously updated averages are desirable. The algorithm accomplishing this is a simple recursive, IIR filter, 68 that takes a new cross spectral sample, $x_i$, and adds it to the value of the running average up to that point, $Y_{i-1}$, to get the newest running average estimate, $Y_i$, by using the following rule: $Y_i = (1-w) \times Y_{i-1} + W \times X_i$. where the weight "w" is given by $2/(1+J)$, with "J" being the effective number of samples included in the running average. For example, a one-hour running average, where new samples are acquired every 256 seconds, would have approximately J=14. The first place where these multiple running averages are used is in t he ship-removal algorithm 70 (which can also be used to identify and track ships if desired). Ship echoes appear as spectral spikes that can mask and contaminate portions of the sea echo required for current or wave extraction. They have the property, however, that they are present in a given range cell for only a few minutes, their residence time being equal to the range cell width divided by the ship's radial velocity. Their echo spikes appear and disappear in short time scales compared to typical changes in sea-echo cross spectra. The latter have time constants of hours. Hence, all spectral points in each newly computed cross spectrum are compared to a long-term average (e.g., 3-hour); if an echo increase is observed of more than 8–9 dB, that region is suspected as being spurious (a ship or other noise/interference). In this case, spectral points which fail this stability test are not included in that particular running average. Thus, slow changes typical of sea-surface conditions are allowed, but rapid changes due to a ship traversing the range cell (or a noise burst) are detected and excluded.

In 72, amplitude/phase correction factors are calculated from the sea echo, as already described above in 58. In 74, the parts of the sea-echo used for current extraction (the first-order Bragg echo) and wave data (the second-order echo) are identified and separated from each other and from the noise; this process is described in the above references to Lipa and Barrick. Next in 76, the amplitude and phase correction factors stored and/or determined from 72 are applied to the three antenna signals at each spectral point to be processed. At 78 and 80, we employ algorithms to determine currents and waves, along with their directions of arrival; the mathematics and physics behind these algorithms are described in Lipa and Barrick, cited earlier.

Receive Antenna Unit

Figure 3:
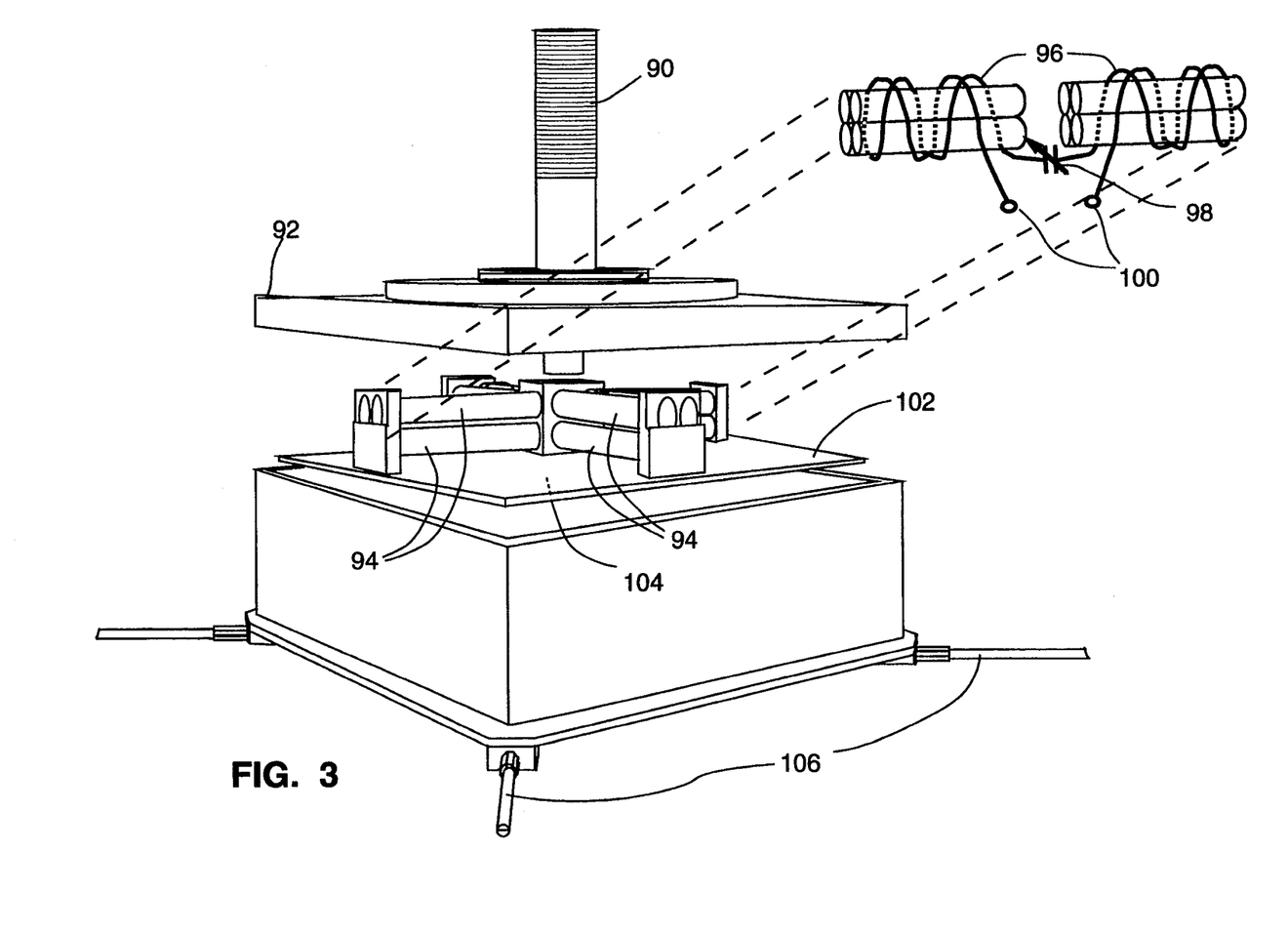
FIG. 3 shows one embodiment of the three-element colocated crossed-loopstick / monopole receive antenna unit. The box containing the loopstick elements is weatherproof plastic. On the board beneath the loopsticks is mounted a printed-circuit implementation of a preamplifier that makes these two elements "active antennas." The monopole is a fibreglass whip that screws onto the top 90. If used also as the transmit antenna, this would normally be a quarter wavelength at the lower frequencies of intended operation. Four radial whip elements 106 screw into the four corners of the base, serving as an electrical counterpoise to the monopole whip.

FIG. 3. One preferred embodiment of a three-element receive antenna, contained in a plastic case and covered with a weatherproof lid 92, is shown in FIG. 3. Ferrite rods 94 of Type #61 material (supplied by Amidon, Fair-Rite, and other companies) provide adequate sensitivity below 25 MHz so that external noise is always higher than internal. The rods are arranged as shown, with a space in the middle, through which the monopole element passes 90; this ensures that all three antennas have the same phase center for vertical polarization. The rods on each side (two or more rods, as shown, are preferred because their efficiency is higher than one) are wound with wire 96, sometimes coaxial cable in which the outer shield carries the radiating current. In the embodiment shown in FIG. 3, the isolation between loops and monopole is increased because of the symmetrical splitting of each loop into two halves arranged on either side of the monopole; also, the orthogonal loops are layed out in the same plane, rather than in the over-/under configurations of our former designs. Each half of a complete loop—split on each side of the center—is wound and counterwound with the same number of turns as shown in 96; this counterwinding cancels any unsymmetric longitudinal E-field component along the loop axis that can distort the pattern and/or couple to feedlines. Balance is achieved by connecting the loop halves in series, with a tuning capacitor 98 between the two halves; the other ends of each loop half 100 are fed into differential preamplifiers (a standard push-pull arrangement with respect to ground) layed out on the board beneath the rods 102. The preamplifiers have 50-ohm inputs and noise figures typically better than 4 dB; these are available from several suppliers. In some embodiments, mismatching into high-impedance preamplifiers is preferred, where broader bandwidth or more stability are desired. The vertical whip monopole is fed against short radial elements 106. Because the monopole is usually more efficient than the loopsticks, normally it does not require preamplifiers. If the monopole is also used for transmit (as is the case in some applications), a special T/R (transmit-receive) switch is employed to keep the strong transmit signal out of the receiver front end.

Although ferrite rods have been used for decades as the heart of lower-frequency loop antennas, a design methodology has not yet appeared in the literature. We outline a tunedloopstick design approach of one embodiment for radar applications. The number of turns is kept sufficiently small that the loop is operating below its first anti-resonance. Its resulting pattern is a cosine function (figure-8) vs beating angle. The exact number of turns is increased until the input resistance is about 50 ohms to provide an impedance match to the lines. At this point, the input reactance (measured with a network analyzer) will typically lie between 800 and 2000 ohms, and will be inductive. A series capacitance is inserted and adjusted until this inductance is canceled by tuning. The equivalent circuit for the antenna is therefore a loss resistance (nearly 50 ohms) in series with a very small radiation resistance, in series with an inductor followed by the series capacitor of equal and opposite reactance at the center of the band of desired operation. Loopstick antennas we have thusly designed and tested have 3-dB bandwidths spanning 7–10% of the band center. Most of the input resistance is due to losses, mainly ferrite core dissipation.

The radiation resistance part can be estimated from the formula:

$$R_r = 320 \, \pi^4 [\mu_e N(A/\lambda^2)]^2,$$

where A is the cross-sectional area of the ferrite rod core; N is the number of turns; $\lambda$, is the wavelength of the radio signal; and $\mu_e$ is the effective relative permeability of the ferrite core. Typical 7.5-inch-long rods of #61 material with dispersed windings have an effective relative permeability of about 70. Efficiency (or power gain) of the loops is then approximately $R_r/R_i$, where $R_i (=50$ ohms) is the input resistance of the loopstick. In units we have built and tested using #61 ferrite rod material, gains we typically achieve are: $-55$ dB at 6 MHz; $-35$ dB at 12 MHz; and $-22$ dB at 25 MHz. At these frequencies, external noise typically exceeds internal by at least 60 dB; 40 dB; and 28 dB, respectively. Hence, the efficiencies of these miniature receiving antennas provide optimum radar sensitivity, i.e., loop antennas designed with greater efficiency result in no radar performance improvement. We have found that increasing the number of rods in the winding center from one to two typically increases the gain by 3 dB, when using the 50-ohm criterion to select the number of turns. A further increase from two to four rods increases gain by 1–2 dB, indicating diminishing return.

Above 25 MHz, where external noise drops further, we find that small air-core loops are more effective in keeping internal noise below external. These are usually single or two-turn capacitively tuned loops, whose number of turns and size are adjusted to achieve the best compromise between required bandwidth and gain across this band. The bandwidth is typically broadened to 10% by reducing their size so the input resistance (which in this case is nearly the radiation resistance) is a fraction of the 50-ohm line value, purposely forcing a mismatch to the line and also broadens the bandwidth. At 35 MHz, for example, a 2-turn air loop only 30 cm in diameter has a bandwidth of 3 MHz and a gain of $-10$ dB, keeping internal noise levels below external while maintaining compact size.

DESCRIPTION OF OPERATION

Signal Processing and Waveform Design

Antenna Signal Processing for Angle Determination

Software methodologies are described here, as examples, for both three and four-element crossed-element receive antennas. Consider first the three-element configuration of FIG. 3, with ideal patterns. The voltages received on the two horizontal loopsticks (which are magnetic dipoles) and the vertical whip (which is an electric dipole) responding to an incoming, vertically polarized signal of complex amplitude S from bearing angle $\Phi$ with respect to Loopstick #1 axis are $v_1 = S \cos\Phi$, $v_2 = S \sin\Phi$ for the orthogonal loops; and $v_3 = S$ for the monopole. (Bold lettering denotes complex quantities.) After target detection, software divides the two loop signals by the monopole signal so that signal strength drops out, and the ratios: $r_{13} = v_1/v_3 = \cos\Phi$; and $r_{23} = v_2/v_3 = \sin\Phi$ are obtained. A simple call to the computer library's ATAN2 function with these ratios as inputs then gives the desired unambiguous bearing angle, $\Phi$. This assumes that the amplitudes and phases of the signals into the loops have been adjusted to be matched, which is accomplished by algorithms 58 and 72 described earlier. This ratio process is also used as a robust basis for bearing determination when the patterns are distorted from their idealized dipole cosine-functions. In this case, the actual bearing patterns are measured during the calibration phase. These ratios then comprise the software look-up library for bearing DF, in place of the idealized "ATAN2" function.

The above process works only for vertically polarized signals, where only bearing (azimuth) of the target signal is required. Another embodiment of a radar receive antenna that can obtain bearing and elevation angles for signals of arbitrary polarization is described here. In addition to the two horizontal crossed magnetic dipoles (loopsticks) and vertical electric dipole, a vertical magnetic dipole (loopsticks) is included and configured around the whip, to form a four-element unit. The relevant definitions here are:

$\Phi$ = Bearing (azimuth) angle;

$\mu$ = Elevation angle;

$F_v$ = Field strength of vertically polarized incoming signal component;

$F_h$ = Field strength of horizontally polarized incoming signal component.

The received antenna voltages are then:

$$V_{vM} = F_h \cos\mu; \quad (1)$$

(voltage received on vertical magnetic dipole)

$$V_{vE} = F_v \cos\mu; \quad (2)$$

(voltage received on vertical electric dipole)

$$V_{hM1} = +F_v \cos\Phi + F_h \sin\mu \sin\Phi; \quad (3)$$

(voltage received on horizontal magnetic dipole #1)

$$V_{hM2} = -F_v \sin\Phi + F_h \sin\mu \cos\Phi. \quad (4)$$

(voltage received on horizontal magnetic dipole #2)

Substituting Equations (1) and (2) into (3) and (4) to eliminate the unknown field strengths in the latter two yields:

$$V_{hM1} = +V_{vE} \sec\mu \cos\Phi + V_{vM} \tan\mu \sin\Phi; \quad (5)$$

$$V_{hM2} = -V_{vE} \sec\mu \sin\Phi + V_{vM} \tan\mu \cos\Phi. \quad (6)$$

The complex voltages are the quantities observed by the four antennas. These two complex equations become four real equations in two real unknowns, bearing, $\Phi$ and elevation angle, $\mu$. The method employed in algorithm 64 to solve this set is maximum likelihood, which provides the optimum solution for these angles in the presence of noise and other errors. In order to show here that these equations do indeed have unique solutions, we derive a closed-form expression for the elevation angle, and thence the bearing angle. First, form quadrature sums of the voltages from the two crossed horizontal dipoles, i.e., Equations (5) and (6). (This can be done either in hardware using 90° directional couplers, or digitally in software.) Denote by subscripts "R" and "L" right and left-handed quadrature sums.

$$V_{qR} \equiv V_{hM1} + jV_{hM2} = (V_{vE} \sec\mu + jV_{vM} \tan\mu)e^{-j\Phi}; \quad (7)$$

$$V_{qL} \equiv V_{hM1} - jV_{hM2} = (V_{vE} \sec\mu - jV_{vM} \tan\mu)e^{+j\Phi}. \quad (8)$$

Now multiply Equations (7) and (8) each by their complex conjugates. This gets rid of the complex exponentials, eliminating $\Phi$, and allows solution for elevation angle, $\mu$. Then add the resulting equations together and use the identity $\sec^2\mu = 1 + \tan^2\mu$ to obtain the following solution for elevation angle in terms of the measured voltages:

$$\tan^2\mu = \frac{1}{2} \cdot \frac{v_{qR}^2 + v_{qL}^2 - 2v_{vE}^2}{v_{vE}^2 + v_{vM}^2}. \quad (9)$$

The above squares are taken on the absolute values (amplitudes) of the voltage signals. Using this solution for elevation angle and the measured voltages, one solves directly for bearing angle, $\Phi$. This is done by dividing Equation (7) by (8) and taking the principal complex square root:

$$e^{+j\phi} = \sqrt{\frac{v_{qL}}{v_{qR}} \cdot \frac{v_{vE}\sec\mu + jv_{vM}\tan\mu}{v_{vE}\sec\mu - jv_{vM}\tan\mu}}. \quad (10)$$

The above analysis demonstrates that both elevation and bearing angles can be determined from the four-element antenna unit described, even when the signal is arbitrarily polarized, and its polarization state is unknown.

FMCW Waveform Design and Digital Processing Rules: Double FFT Method

We describe here the rules for the waveform design and its digital processing that underly the present invention. In the fundamental embodiment, the frequency of the waveform is linearly swept over an interval of time called the sweep repetition interval; its reciprocal is referred to as the sweep repetition frequency, SRF. The objective of all signal designs herein is to avoid creating blind zones in radar coverage, and to avoid aliasing, ambiguities, and/or ghosting in range and Doppler space. In the "double-FFT" processing to be described now, the SRF, if possible, is taken to be at least twice the maximum Dopplers expected from the class of targets under consideration. As an example, assume the radar is to observe aircraft targets, with maximum speeds of Mach 0.5 ($\sim$150 m/s). At 20 MHz radar frequency, the maximum Doppler is therefore $2v/\lambda = 20$ Hz, where wavelength, $\lambda$, is 15 m. Setting the SRF at 40 Hz meets this criterion. The sweep width, B, depends on the desired range resolution according to the following role: $B = c/(2\Delta R)$, where c is the speed of light ($3 \times 10^5$ km/s) and $\Delta R$ is the desired range resolution. Assume for the example that $\Delta R$ is to be 3 km; then B=50 kHz. In the simple embodiment being illustrated, the frequency is therefore swept in one direction (e.g., upward) from 20 MHz over 50 kHz in 1/40 second; this sweep process is then repeated every 1/40 second. If no pulsing or gating were employed (i.e., 100% duty factor or pure CW), the radar's baseband signals (created after mixing the received target echo signals with the transmitted linear frequency ramp 32) represents consecutive range cells every 40 Hz, and the spectral region about each 40 Hz position is the target's Doppler shift of $\pm$20 Hz from the range cell center at the multiple of 40 Hz. Each range cell is spaced at 3 km from the radar, e.g., 0 Hz$\rightarrow$0 km; 40 Hz=$\rightarrow$3 km; 80 Hz$\rightarrow$6 km; . . . ; 600 Hz$\rightarrow$45 km. This frequency spread is referred to here as the baseband information spectrum. The embodiment of the processing shown in FIG. 1 employs a double-FFT processing sequence to separate first the target echo space into range cells 46, and then to process these range cells in a second FFT for Doppler 50. If all ranges from 0–45 km are desired, then the first FFT is performed on the time series taken over a single sweep of 1/40 second, with 32 real points sampled at a $32 \times 40 = 1280$ Hz rate. The first 16 complex output points from this FFT represent 16 range cells every 3 km. The length of the second FFT depends on the reciprocal of the desired Doppler resolution. For our example, 512-point second FFT processing will require output accumulation from the first FFF for each range cell $512 \times (1/40) = 12.8$ seconds, providing a Doppler resolution $1/12.8 = 0.078125$ Hz. The linear FMCW signal design and processing to this point for pure CW signals are not new; the principles are described in the first inventor's reference cited earlier [Barrick, 1973]. It is the addition of pulsing/gating, and the rules and methods for avoiding ambiguities, that are new and are described next.

The pulse/gate widths are set according to the following role, recognizing that this pulse/gate modulation of the signal replicates the baseband information spectrum at multiples of the gate repetition frequency (GRF). In simple square-wave on/off sequencing of transmitter and receiver, the pulse width is made sufficiently long that targets from the radar to maximum desired range are seen without interruption. If possible, it is kept short enough that the GRF is at least twice the information spectral span near DC containing the desired range cells, in order to avoid aliasing or ghosting. For example, assume 15 range cells are desired, from 0 out to 45 km, that occupy the region out to 620 Hz. If the target at maximum range, 45 km, is to be illuminated 50% of the time, then the pulse width must be $2 \times 45/c = 300$ $\mu$s. Since the off-time (gate width) is also 300 $\mu$s, then the total repetition interval for the square wave is 600 $\mu$s, and its reciprocal, GRF=1667 Hz. Therefore, the first sideband center of the pulse/gate modulation lies at 1667 Hz, and the 15 range-cell span is $1667 + 620$ Hz about this sideband center. The sidebands, therefore, do not overlap the baseband information spectrum from DC to $\pm$600 Hz, and there is no range-cell aliasing caused by the gate-modulation sidebands. The low-pass filter 34 in the receiver baseband section cuts off slightly beyond 620 Hz, to eliminate the undesired modulation sidebands and noise, making the receiver implementation a true matched filter. This signal, after low-pass filtering, can be sampled by the A/D 38 at a rate as low as 1280 Hz (the Nyquist rate of twice the information bandwidth, 640 Hz). Therefore, we achieve: (i) the desired optimal match-filter receiver processing; (ii) no aliasing or ambiguities in range or Doppler information; (iii) a much lower baseband bandwidth and data rate (1280 Hz) than the 50 kHz RF bandwidth required for the specified range resolution; the bandwidth reduction is identically the ratio of the SRF to the GRF. In conventional "chirp" radar signals, the linear sweep occurs over a single pulse; here, the sweep repeats much less frequently than the pulsing. Also, in the present scheme, the match-filter processing takes place digitally, in the frequency domain, whereas with chirp, the compression is produced in the time domain by dispersive delay lines.

Overcoming Range/Doppler Aliasing

Described next is an improvement that overcomes aliasing and ambiguity problems when the above design goals cannot be realized. The rules behind this invention are best illustrated with an example, taken as a variation on that of the above two paragraphs. Suppose that the maximum target velocity to be encountered is now Mach 1 (300 m/s) instead of Mach 0.5. The maximum Doppler shifts for a 20 MHz radar frequency are now ±40 Hz. Following the preceding rules, the SRF must be 80 Hz, and each range cell spans ±40 Hz, centered every 80 Hz from DC. Thus, 15 range cells now extend to 1200 Hz instead of to 600 Hz. If the pulse/gate width were designed for a maximum range of 45 km, as before, the sidebands of the GRF at 1667 Hz would cause overlapping, or aliasing: the baseband information spectrum extends from DC to 1240 Hz, while its first sideband spans 1667 Hz±1240 Hz. Therefore, several outer range cells of the 16 are aliased, and recognition of the proper target ranges is ambiguous.

After mixing to baseband, the echo signals in each channel have frequency $f_R$ proportional to the range to the target, resulting from the frequency sweep. An idealized square-wave modulation, representing the pulse/gate process, gives a signal representable as:

$$s(t) = A \sum_{n=0,1,\ldots}^{\infty} \left( \frac{\sin \frac{n\pi}{2}}{\frac{n\pi}{2}} \right) \sin(2\pi f_R t - 2\pi N f_G t + \phi),$$

where A and $\Phi$ are the signals arbitrary amplitude and phase, and $f_G$=GRF is the gate repetition frequency. The series represents replication of the baseband signal, $A \sin(2\pi f_R t + \Phi)$, at the GRF harmonics. To illustrate the interplay of gating and sampling, reconsider the prior example of the Mach 0.5 situation, where we take the GRF to be exactly 1280 Hz (twice the baseband bandwidth that contains the 16 range cells each 40 Hz wide). This GRF, which is slightly lower than our previous 1667 Hz, gives maximum target illumination slightly further out, i.e., at 58.6 km instead of 45 km. Let us sample the signal at exactly this 1280-Hz rate, this being also the Nyquist rate. Then time "t" is discretized as $t_j = j\Delta t$, where $\Delta t = 1/f_G$ is the sampling interval. The sampled signal is:

$$s(t_j) = A \sum_{n=0,1,\ldots}^{\infty} \left( \frac{\sin \frac{n\pi}{2}}{\frac{n\pi}{2}} \right) \sin(2\pi f_R j\Delta t - 2\pi n + \phi) =$$

$$A\sin(2\pi f_R j\Delta t + \phi) \cdot C_s, \text{ where } C_s = \sum_{n=0}^{\infty} \left( \frac{\sin \frac{n\pi}{2}}{\frac{n\pi}{2}} \right).$$

Therefore, we have recovered our desired baseband signal, $A \sin(2\pi f_R t_j + \Phi)$, multiplied by a fixed constant, $C_s$, representing the summation. No aliasing is encountered.

Now come back to the Mach 1 target-speed example, where the gate frequency is kept the same, $f_G$=1280 Hz, to allow desirable range coverage. The SRF is increased to 80 Hz in order to give unambiguous Doppler. The baseband information for 16 range cells 3 km in extent spanning 0–45 km thus extends to 1280 Hz. Aliasing now occurs, since the lower 16 range-cell frequency bins from the first sideband overlay the 16 that extend upward from DC. Make the A/D sampling frequency exactly twice this; i.e., $2 \times 16 \times 80$ Hz=2560 Hz, with sampling interval $\Delta t = 1/(2f_G)$. The equation for the sampled signal is now:

$$s(t_j) = A \sum_{n=0,1,\ldots}^{\infty} \left( \frac{\sin \frac{n\pi}{2}}{\frac{n\pi}{2}} \right) \sin(2\pi f_R j\Delta t - \pi n + \phi);$$

or: $s(t_j) = A \sin(2\pi f_R j\Delta t + \phi) \cdot C_s$ for $j$ even;

and: $s(t_j) = A \sin(2\pi f_R j\Delta t + \phi) \cdot C_d$ for $j$ odd;

where: $C_s = \sum_{n=0,1,\ldots}^{\infty} \left( \frac{\sin \frac{n\pi}{2}}{\frac{n\pi}{2}} \right);$ and: $C_d = \sum_{n=0,1,\ldots}^{\infty} (-1)^n \left( \frac{\sin \frac{n\pi}{2}}{\frac{n\pi}{2}} \right).$ Sampling at twice the GRF replaces the $2\pi n$ phase factor in the previous equation by $\pi n$. This produces different weightings on every other time-series point, $C_s$ or $C_d$, as defined above. Since these two weighting constants are known (calculable or measurable), one can divide the even time-series points by $C_s$ and the odd points by $C_d$, thereby removing the unequal weightings that cause the aliasing. Thereby, the original unweighted time series is recovered; i.e., $A \sin(2\pi f_R t_j + \Phi)$, as though no gating had been used, and the range-gate aliasing is eliminated. This time series is sampled at 2560 Hz, adequate to contain the 16 range cells 80 Hz each, spanning a total of 1280 Hz. This time series for the single sweep over 1/80-second, is now ready for the first 32-point FFF. Processing from here on remains the same as described earlier. The constants $C_s$ and $C_d$, needed to remove the aliasing, could also be measured by injecting test signals into the receiver, rather than being calculated from the series above. The pure square-wave modulation, which is what the summations represent, are distorted by the receiver filters and have their higher harmonics (terms for larger "n") suppressed/removed by the low-pass filter 34.

Another, often more suitable method for removing these constants (and thereby the aliasing) is now described. Here, each of the two sets of time series (for the odd and even time points) is processed separately. For the above example, each set contains 16 points, which after the first FFT, yields 8 aliased range bins; i.e., the 0-th and 15-th are aliased; the 1-st and 14-th; the 2-nd and 13-th; etc. The eight complex output bins—for each of the two separate odd/even arrays—are then processed as they would have been through the second FFT, giving Doppler. At this point, suppose a target echo is found in a given range/Doppler cell. Since range is aliased, there are two possibilities. This target echo will appear at the same range/Doppler cell for both of the two sets of odd/even outputs. This target echo in each will have constants $C_d$ and $C_s$ as multiplicative factors. (In fact, this is a convenient way to determine the relative factors, their ratio being all that is needed.) Then, if the (relative) ratio is divided out of the target echo, equalizing the echoes, a third FFT 56 (consisting of two points for our example here) will then "de-alias" them. Suppose the target appeared in the third bin of 8 in each of the two sets (at the same Doppler point); this could correspond to the target lying in either range cell 2 or 13. After the third FFT, if the output shows up as the first (of two) points, the true range cell is 2; if the second (of two), the range cell is 13. The result is the same as though the constants had been divided out first, as described in the preceding paragraph, and the second FFT taken. The advantages of the present approach are: (i) the required constants are more easily determined, as described here; (ii) fewer operations are necessary, because the de-aliasing described need be done only on spectral peaks representing targets; (iii) the aliasing constants $C_d$ or $C_s$ are generally range-dependent, and this gives a way of determining and applying the correct constants to the proper bins.

Although this method of removing aliasing was illustrated with an overlap/aliasing factor of two, the method is general and works for any integral multiple (e.g., factors of two) of the sampling frequency. If the Doppler window were 160 Hz instead of 80 Hz, then the 16 range cells would occupy 2560 Hz, and one would sample at 5120 Hz; there would then be a set of four weights representing to be determined and removed. Again, either dividing each out initially, or the third-FFF method (being now a 4-point FFT) would be employed. And so on.

FMCW Waveform Design and Digital Processing Rules: Single FFT Method

A second range-Doppler processing method is now described that can often be used advantageously with certain classes of very high-speed targets. The double-FFT procedure heretofore described, applied to this case, would lead to both: (i) very high baseband information spectral content; as well as (ii) extensive range-Doppler aliasing for which the de-aliasing methods discussed above become cumbersome. The method described here uses single-FFT processing applied to linear FMCW signals having two (consecutive or simultaneous) sweeps of different rates. In this method, Doppler becomes the large baseband frequency offset, and range is the smaller offset, contrary to the prior technique. We illustrate the design rules with an example. Assume the targets under consideration have velocities lying between Mach 4 and Mach 10 (e.g., corresponding to ballistic missiles). At 20 MHz radar frequency, the corresponding span of Doppler frequencies is 160 Hz to 400 Hz. Examine first a constant-frequency radar signal, with no sweep applied. After mixing to baseband, this signal is low-pass filtered 34 to 500 Hz and sampled at a 1024-Hz rate for one second. An FFT of this signal produces a target spike that is 1 Hz wide, falling between 160 and 400 Hz, corresponding to the target's Doppler. No range information is conveyed. Next, assume the signal is swept linearly over 10 kHz during this one-second period, and this swept replica is mixed 32 with the received signals, as before. In the no-sweep case, a Mach-6 target velocity produced an echo peak (or Doppler) at 240 Hz. The sweep adds or subtracts an offset (corresponding to whether the sweep was down or up) that is proportional to the target's range. For example, if the target is 600 km from the radar, this range offset is 40 Hz. Since frequency resolution in this example is 1 Hz, each spectral resolution bin corresponds to a 15 km target range shift. If two consecutive 1-second sweeps are applied (up and down), they will produce echoes with their peaks at 200 Hz and 280 Hz. The mean position of these two peaks (i.e., 240 Hz) is therefore the target's Doppler. Their difference (i.e., 80 Hz) gives the target's range. Since there are 80 bins between the two peaks, the range resolution for this example is 600 km/80=7.5 km.

The sweep design and processing procedures now become clear. If the up/down sweep embodiment described above is employed, the linear variation in each sweep is $c/(4\Delta R)$ Hz, where "c" is the radio wave propagation speed and $\Delta R$ is the desired range resolution. The sweep time, "T", determines the frequency shift offset from the target's pure CW Doppler. A spectral bin of width $\Delta F=1/T$ corresponds to one range cell $\Delta R$ wide. This time is usually determined by the nature of the target; for example: (i) how long is one willing to wait between target information updates; and (ii) is the target accelerating sufficiently over time T that target energy is spread over several bins, negating the signal-to-noise advantage of longer times? The maximum target spectral frequency at baseband is the sum of: (i) the maximum target Doppler shift expected; (ii) the added offset due to maximum target range, $R_m$, anticipated, which is $F_m = \Delta F \times R_m/\Delta R$; and (iii) any intentional IF offset introduced at the mixer 32. The signal is then sampled at a rate exceeding twice this sum, according to the Nyquist criterion.

Figure 4A:
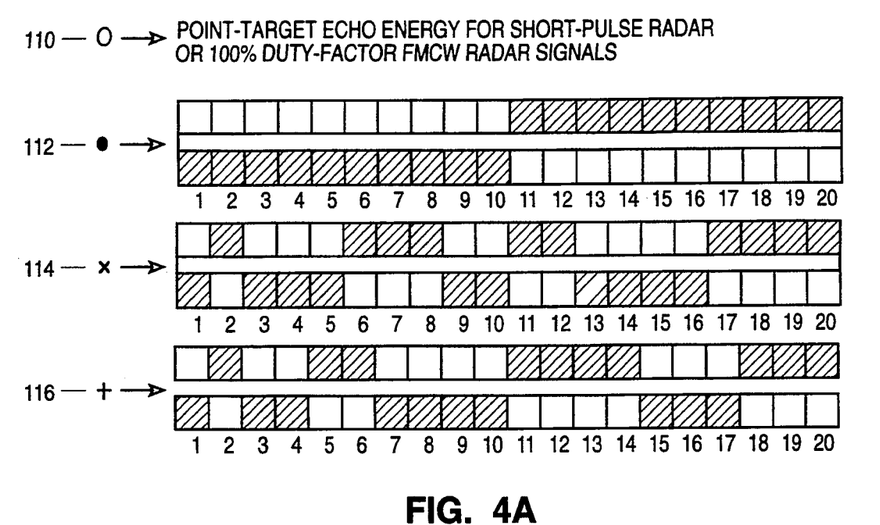
FIG. 4 illustrates examples of 50% duty-factor pulsing-gating arrangements that provide different target echo energy distributions with distance from the radar. The top strip of each of the three examples represents the transmit signal pulsing pattern; a white square indicates a pulse is present at that time interval, and a black indicates no pulse. Immediately below is the required gate pattern in the receiver, ensuring that the receiver is turned off when transmitting, and is turned on when not transmitting; a white square indicates the receiver is on at that particular time interval, and a black that the receiver is switched off. These patterns repeat themselves indefinitely at the end of the twenty shown here. Twenty intervals in a pattern are not required, and are an example used here only for illustrative purposes. The graph shows the target echo energy vs range from the radar for the three pulse/gate patterns above it, along with the reference from a conventional shortpulse radar (or alternately, one with 100% duty factor).
Figure 4B:
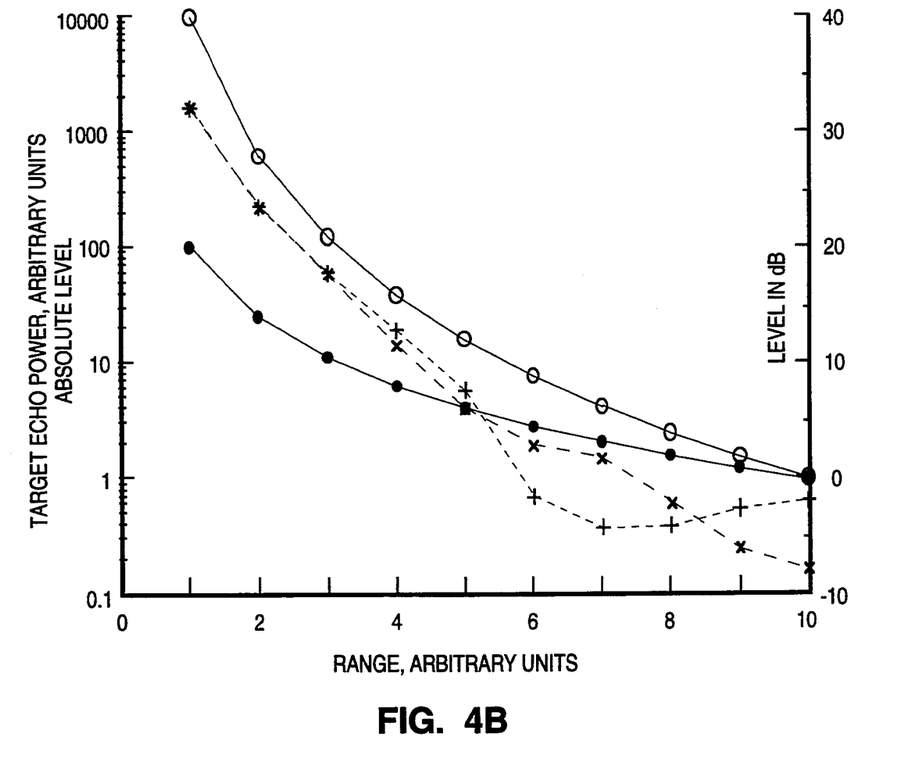

This single-FFT method works well against one or a few high speed targets, where clutter and multiple lower speed targets can be separated by their lower Dopplers. Even with their range offsets added to Doppler, the undesired, low-speed targets are all segregated to a well-defined sector of the spectrum after digital processing. As with the preceding double-FFT methods, aliasing or ghosting occurs if the GRF is lower than twice the baseband information spectrum, represented by the sum defined above. In this case, the de-aliasing methodology described earlier may be applicable. In other cases this aliasing can be totally circumvented by using a very high GRF. Since a "blind zone" occurs at range multiples of $c/(2 \times GRF)$, these are mitigated by the fact that the high-speed target passes out of a blind region during the FFT processing period, T. For example, consider square-wave gating of 10 $\mu$s on/10 $\mu$s off, corresponding to GRF=50 kHz. Blind zones are now spaced 3 km apart, and the distance between a blind zone and an illumination maximum is 1.5 km in range. A Mach 6 target flying at 1.8 km/s will therefore always pass through one blind zone and through an illumination maximum during each processing interval, and hence the radar will never be blind to targets with these higher speeds. Designing Target Echo Strength Dependence on Range: FIG. 4. We describe in greater detail how the target echo energy depends on its range, R, using the signal design and processing rules described above and embodied in the present invention. This target echo energy seen by the receiver does not follow the $R^{-4}$ law, as it does with conventional radars. In fact, we describe how the target energy can be purposely tapered with range in order to provide an illumination profile tailored to a specific application. Examine first the simple pulsing/gating example discussed up to now. To achieve uninterrupted illumination of target-space up to 58.6 kin, we modulated with a square wave having on and off times each of 390.625 $\mu$s, with a GRF of 1280 Hz. With the aid of FIG. 4, this is depicted by the pulse/gate sequencing shown in 112. The upper panel of 112 represents the transmit pulsing, and the lower panel of 112 represents the receiver gating (with white meaning "on" and black meaning "off"). As required, the receiver is always off while the transmitter is on, and vice versa. Ten time units therefore represent 390.625 Its for this example, with one time unit being 39.0625 µs. A target located at the maximum range for which this square-wave is designed (i.e., 58.6 kin) sees and radiates the voltage signal 50% of the time. However, a target closer to the radar will see and radiate the signal less than this amount. The resulting target-echo baseband information spectral energy is proportional to $R^2$ from the radar out to 58.6 km. This partially offsets the normal $R^{-4}$ two-way space loss, leaving an overall target energy dependence on range at the receiver output of $R^{-2}$. The relative plots of target-echo energy (both in absolute power units and also in decibels) is shown in the lower part of FIG. 4, with the symbols (circles) given by 110 being $R^{-4}$ (the falloff of a conventional radar), and the solid dots 112 being the $R^{-2}$ falloff of the square-wave gating. Both achieve the same levels for the same average power at maximum range (10 units=58.6 km). The slower target-energy decrease with range thereby achieved is desirable, because conventional radars usually require complex, active STC (sensitivity-time control) circuitry to clamp down the receiver gain for targets from close-in ranges, so as not to overdrive the receiver and to flatten the signals' dynamic range. We have found that the present invention therefore eliminates the need for STC circuitry. Further target-energy flattening with range, if required, is conveniently realized using a simple, passive high-pass filter 34 at baseband; a properly tailored filter characteristic will suppress signals at lower frequencies that come from shorter ranges.

In certain applications it may be desirable to have greater target energy at shorter ranges than is afforded by the square-wave pattern of 112 with its $R^{-2}$ dependence. This can be done with different pulsing/gating patterns than the square wave. These still maintain the 50% duty factor for maximum signal efficiency, and ensure that transmitter and receiver are never on at the same time; furthermore, the signals are periodic. Two examples of pulse/gate patterns that accomplish this are shown in FIG. 4 as 114 and 116. In 116, energy at short ranges is greater than the square wave by 12 dB, while at maximum range it suffers only a 2 dB drop; it is worse at range unit 7 by about 10 dB, however. In 114, the signal at maximum range is 8 dB worse, but has comparable or higher energy than the square-wave 112 up to range unit 7. The energy for these on-off patterns is the square of the convolution of the upper and lower strips, and this is used therefore to design range energy tapers in a methodical way. In this mathematical convolution, white pulses are ones and black are zeros. The zero-range position output from the convolution corresponds to the overunder registration shown; maximum range occurs when the lower strip is slid ten units with respect to the upper (for the ten-bit code exemplified here).

Incorporating Spread-Spectrum Method into Waveform Design and Processing

A final invention is now described that allows spread-spectrum radar operation along with any of the waveforms discussed above. The embodiment examined here effectively causes the frequency that is downloaded from the digital control unit 18, generated in the direct digital synthesizer 20, radiated, and mixed with the received signals to be jumped in a completely random manner at short time intervals. These time intervals are much shorter than the overall processing times required for range-Doppler determination, and could typically be as small as the gate interval (e.g., 300 µs). If such rapid, random hopping is done over a wide band, intercept by others is difficult. Yet the invention achieves the advantages of the same coherent processing gain—and the increased S/N sensitivity implied therefrom—as from the un-hopped versions discussed earlier.

The essence of the method (before sweeping is considered) varies the gating and sampling frequencies in direct proportion to the random radar frequency selected. Consider first an unswept but gated 20 MHz CW radar signal, which before hopping, would have been square-wave gated at a 1280 Hz rate (390.625 µs on/off periods) and sampled also at a 1280 Hz rate. Assume for now a single FFT is applied, 1024 points long, over data collected for a time interval (1024/1280 Hz)=0.8 seconds. Before processing, a Mach 0.5 target echo will be a sine wave with a 20 Hz Doppler offset (from DC), and will be sampled exactly 1280/20=64 times per cycle. After processing, a spectral peak with 1/0.8=1.25 Hz frequency resolution will appear in bin number 20/1.25=16 from DC. Now after ten pulse/gate periods, let the radiated frequency jump to 24 MHz. (Up to this time, ten samples have been acquired during the ten gate periods.) The target's Doppler shift will now also jump in direct proportion: i.e., become 24 Hz instead of 20 Hz. If samples are collected at the same 1280 Hz rate, the jump in target Doppler frequency would destroy the advantage of coherent processing, since the target would appear at a different frequency. Coherent gain is achieved only if the target stays in one frequency bin during the processing period. However, let the signal sampling also change at the instant of the frequency jump, at an exactly proportional higher rate, to $1280 \times 24/20 = 1536$ Hz. There are now exactly 1536/24=64 samples per sine wave for our Doppler shifted target echo, same as before. Hence, there will be no longer be any apparent change to the coherent processing after this frequency jump, because the sampling rate was adjusted in direct proportion. The GRF should be increased proportionately, to 1536 Hz from 1280 Hz, meaning the on/off times drop from 390.625 µs to $390.625 \times 20/24$ µs; thus during ten pulses, exactly ten samples are still collected, like before. Thus, every ten pulses the frequency can jump randomly, and if the sampling and gating frequencies are changed in direct proportion, the appearance will be the same: a continuous sine-wave signal is being sampled and processed, as though the radar frequency were kept constant. Although it is important that the frequency be changed at each jump in a phase-continuous manner, this is also the nature of direct-digital synthesizers 20, so the system of FIG. 1 meets this condition automatically.

Additional changes required to the linear frequency sweep (that was imposed to obtain range) are: (i) the sweep-repetition frequency (SRF) must be changed; and (ii) the sweep rate (bandwidth change per sweep interval) must changed; both in exact direct proportion to the random frequency jump. These ensure that the frequency offset due to range (after mixing to baseband) is increased so that—after the proportional sampling increase—the same number of samples per target-echo sine wave are being collected. Thusly, coherent processing is maintained after any number of random frequency jumps by keeping all waveform and processing timing locked to the jump size. It matters not whether double or single FFT processing is employed. With this procedure, the actual processing time may vary (since timing jumps when the random frequency jumps), but the number of samples in the FFTs always remains fixed. The one effect that limits the performance of this (or any spread-spectrum method) is the frequency response of antennas, the system, and the target echo radar cross section. When the frequency band across which hopping occurs is so broad that any of these factors changes significantly, some coherent processing gain will be lost, if correction is not made. Although the system factors can be calibrated and corrections for them applied in software, such is not true for the radar target, whose radar response must be considered unknown. However, target responses vs frequency vary much less for low-frequency radars than for microwave radars, mitigating this issue to some extent. Nonetheless, this is a tradeoff that must be considered in selecting the frequency-hopping bandwidth.

SUMMARY, RAMIFICATIONS, AND SCOPE OF INVENTION

Thus the reader will see that the gated FMCW DF lower-frequency radars of the present invention represent compact, efficient but simple alternatives to conventional microwave radars for many commercial and military applications. By employing DF principles on receive rather than beam forming, target angles are determined with compact antennas and with high system sensitivity for wide-angle surveillance missions. Doppler processing, along with range determination, provides another dimension to the target's observables. The unique waveform with very high duty factor, along with its digital generation and processing, permits very low data rates that allow real-time processing to be done with simple, inexpensive personal computers. Methods for avoiding and overcoming range-Doppler ambiguities and blind zones against moving targets are detailed herein. A technique is included that allows spread-spectrum radar operation (when this feature is needed), to avoid signal intercept as well as interference to others.

Although the description above contains many specifities, these should not be construed as limiting the scope of the invention, but rather as exemplifications of presently preferred embodiments thereof. For example, although three and four-element DF crossed-dipole receive antennas were discussed, two or five elements employing the same principles can also be used to determine bearing in certain situations. Or, the spread-spectrum frequency-hopping can be used with 100%—as well as 50% or lower—duty-factor waveforms.

Accordingly, the scope of the invention should be determined by the appended claims and their legal equivalents, rather than by the examples given.

We claim:

1. A compact antenna for reception of radar signals, the antenna being part of a radar signal receiving system which includes a receiver and a transmission line, the antenna having an electrical efficiency which is a function of frequency and which causes an external source to contribute an external noise signal during detection of a desired signal, the antenna comprising:
   two magnetic dipoles with each dipole having a phase center, the magnetic dipoles being contained in orthogonal planes and having co-linear phase centers; and
   an electric dipole having a phase center, the electric dipole being contained in a plane which is mutually orthogonal to the planes of the magnetic dipoles, the phase center of the electric dipole being co-linear with the phase centers of the magnetic dipoles, wherein the antenna has a desired electrical efficiency which results in the external noise signal being substantially equivalent to but of greater magnitude than an internal noise signal resulting from sources internal to the receiver, transmission line, and antenna.

2. The compact radar antenna of claim 1, further comprising:
   a third magnetic dipole having a phase center, wherein the phase centers of the three magnetic dipoles and the electric dipole are co-located.

3. The compact radar antenna of claim 1, wherein the desired efficiency of the antenna is achieved by having:

$F_E < F_A,$ where $F_e$ is the amount by which internal noise falls below external noise at the frequency corresponding to the received radar signal and $F_A$ is proportional to the antenna efficiency, where $$F_A = \frac{4R_L R_R}{|R_R + R_L + jX_L|^2} \text{ where,}$$

$R_R$ is a radiation resistance of the antenna, $R_L$ is a remaining resistance of the antenna, transmission line and/or load, and $X_L$ is a remaining reactance of the antenna and/or load.

4. The compact radar antenna of claim 1, wherein the magnetic dipoles are constructed from multiple turns of wire around a non-permeable core, and further wherein, the total length of the multiple turns of wire is less than one tenth of the wavelength of the received radar signal.

5. The compact radar antenna of claim 1, wherein the magnetic dipoles are constructed from multiple turns of wire around a permeable core, and further wherein, the total length of the multiple turns of wire is less than one tenth of the wavelength of the received radar signal.

6. The compact radar antenna of claim 1, wherein the magnetic dipoles are constructed from capacitor-tuned loopsticks.

7. A method for determining the azimuth angle to an object, the method comprising:
   receiving a vertically polarized signal from the object by means of a compact radar antenna, the antenna being part of a radar signal receiving system which includes a receiver and a transmission line, the antenna having an electrical efficiency which is a function of frequency and which causes an external source to contribute an external noise signal during detection of a desired signal, wherein the antenna comprises:
   two magnetic dipoles with each dipole having a phase center, the magnetic dipoles being contained in orthogonal planes and having co-linear phase centers;
   an electric dipole having a phase center, the electric dipole being contained in a plane which is mutually orthogonal to the planes of the magnetic dipoles, the phase center of the electric dipole being co-linear with the phase centers of the magnetic dipoles, wherein the antenna has a desired electrical efficiency which results in the external noise signal being substantially equivalent to but of greater magnitude than an internal noise signal resulting from sources internal to the receiver, transmission line, and antenna; and processing the received signal to determine the azimuth angle.

8. The method of claim 7, wherein the processing of the received signal to obtain the azimuth angle comprises the following steps:
   (1) measuring the voltages produced on each of the magnetic and electric dipoles upon reception of the vertically polarized signal;
   (2) representing the voltage measured on one of the magnetic dipoles as S cos $\Phi$, the voltage measured on the second magnetic dipole as S sin $\Phi$ and the voltage measured on the electric dipole as S, where S is the complex amplitude of the received signal; and
   (3) using the voltages measured on the two magnetic dipoles and the electric dipole to solve for $\Phi$, where $\Phi$ represents the azimuth angle.

9. The method of claim 7, wherein the desired efficiency of the antenna is achieved by having:

$$F_E < F_A,$$

where
$F_E$ is the amount by which internal noise falls below external noise at the frequency corresponding to the received radar signal and $F_A$ is proportional to the antenna efficiency,
where $$F_A = \frac{4R_L R_R}{|R_R + R_L + jX_L|^2} \text{ where,}$$

$R_R$ is a radiation resistance of the antenna, $R_L$ is a remaining resistance of the antenna, transmission line and/or load, and $X_L$ is a remaining reactance of the antenna and/or load.

10. A method for determining the azimuth and elevation angles to an object, the method comprising:
   receiving an arbitrarily polarized signal from the object by means of a compact radar antenna, the antenna being part of a radar signal receiving system which includes a receiver and a transmission line, the antenna having an electrical efficiency which is a function of frequency and which causes an external source to contribute an external noise signal during detection of a desired signal, wherein the antenna comprises:
      three magnetic dipoles with each dipole having a phase center, the magnetic dipoles being contained in orthogonal planes and including two orthogonal horizontal magnetic dipoles and one mutually orthogonal vertical magnetic dipole; and
      an electric dipole having a phase center, wherein the phase centers of the magnetic dipoles and the phase center of the electric dipole are co-located, and further, wherein the antenna has a desired electrical efficiency which results in the external noise signal being substantially equivalent to but of greater magnitude than an internal noise signal resulting from sources internal to the receiver, transmission line, and antenna; and
   processing the received signal to determine the azimuth and elevation angles.

11. The method of claim 10, wherein the processing of the received signal to obtain the azimuth and elevation angles comprises the following steps:
   (1) measuring the voltages produced on each of the magnetic and electric dipoles upon reception of the arbitrarily polarized signal;
   (2) representing the voltage measured on the vertical magnetic dipole as $F_h \cos \mu$, the voltage measured on the electric dipole as $F_v \cos \mu$, the dipoles as $F_v \cos \Phi + F_h \sin \mu \sin \Phi$ and the voltage measured on the other horizontal magnetic dipole as $-F_v \sin \Phi + F_h \sin \mu \cos \Phi$, where $F_v$ is the field strength of the vertically polarized component of the received signal and $F_h$ is the field strength of the horizontally polarized component of the received signal; and
   (3) using the voltages measured on the three magnetic dipoles and the electric dipole to solve for and $\mu$, where $\Phi$ represents the azimuth angle and $\mu$ represents the elevation angle.

12. The method of claim 10, wherein the desired efficiency of the antenna is achieved by having:

$$F_E < F_A,$$

where
$F_E$ is the amount by which internal noise falls below external noise at the frequency corresponding to the received radar signal and $F_A$ is proportional to the antenna efficiency,
where $$F_A = \frac{4R_L R_R}{|R_R + R_L + jX_L|^2} \text{ where,}$$

$R_R$ is a radiation resistance of the antenna, $R_L$ is a remaining resistance of the antenna, transmission line and/or load, and $X_L$ is a remaining reactance of the antenna and/or load.

13. A method of generating a radar waveform and processing a received radar signal which is the result of the waveform being reflected by an object to obtain direction, range, and doppler or radial velocity data for the object, the method comprising:
   (1) generating a waveform having a substantially linear increase in frequency during a sweep repetition time interval, the waveform having a sweep width or increase in frequency dependent upon a desired range resolution, wherein the waveform is repeated during each subsequent sweep repetition time interval, the sweep repetition interval being equal to the reciprocal of a sweep repetition frequency;
   (2) transmitting the waveform by an antenna which is connected to a transmitter operating in a pulsed mode, wherein the pulse period is less than the sweep repetition interval, and further, wherein the transmitter is operated so that it has a duty factor of up to fifty percent;
   (3) receiving the reflected waveform with an antenna which is connected to a receiver, the receiver being gated so that it is turned off during the transmission of the waveform by the transmitter;

(4) mixing the received waveform with the waveform generated in (1), thereby producing a baseband radar echo signal having a center near zero frequency, the radar echo having an offset from zero frequency which depends on a range to the object and the object's radial velocity;

(5) sampling the mixed waveform at a sampling rate which is less than a signal bandwidth corresponding to a desired target range resolution, wherein the sampling rate is higher than two times a bandwidth of a modulation of the mixed waveform corresponding to data which is the target signal information; and (6) processing the sampled waveform to obtain range, doppler, and directional information for the object.

14. The method of claim 13, wherein the processing of the sampled waveform further comprises:

(1) performing a first Fast-Fourier-Transform on the sampled data to obtain the range of the object; and (2) performing a second Fast-Fourier-Transform on a subset of the data obtained from performing the first Fast-Fourier-Transform of the sampled data to obtain the doppler or radial velocity of the target.

15. The method of claim 13, wherein the sweep width, B, is related to the desired range resolution, $\Delta R$, by $$B = c/(2\Delta R),$$

where c is equal to the speed of light.

16. The method of claim 13, wherein the sweep repetition frequency, SRF, is substantially equal to twice a maximum doppler value expected for the object reflecting the transmitted waveform, the maximum doppler value being equal to $$2v/\lambda,$$

where v is a maximum radial velocity of the object and $\lambda$ is a wavelength of the signal transmitted by the transmitter.

17. The method of claim 13, wherein the pulsing of the transmitter and gating of the receiver are performed in a manner so that a first spectral sideband at the pulse repetition frequency is greater in magnitude than a baseband information signal of all possible received object signals, thereby providing a method of generating a radar waveform and processing a received radar signal which significantly reduces range aliasing.

18. The method of claim 13 wherein the processing of the sampled waveform further comprises:

sampling the previously sampled waveform to produce a time series of data, the sampling being performed at a sampling rate equal to M times the pulse repetition frequency, wherein M is a power of two;

segmenting the time series into M separate sub-series, wherein each sub-series has a length substantially equal to 1/M of the unsegmented time series, and further wherein, each sub-series consists of every M-th consecutive point of the unsegmented time series;

performing a first Fast-Fourier-Transform on each of the M separate sub-series to obtain the range of the object;

performing a second Fast-Fourier-Transform on the data obtained from performing the first Fast-Fourier-Transform on each of the M separate sub-series to obtain the doppler or radial velocity of the target; and recombining the data obtained from performing the second Fast-Fourier-Transform on each of the M separate sub-series into a single series, thereby significantly reducing range or doppler aliasing when the pulsing of the transmitter and gating of the receiver cannot be repeated at a rate so that a first spectral sideband at the pulse repetition frequency is greater in magnitude than a baseband information signal of all possible received object signals.

19. The method of claim 13, wherein the receiving antenna further comprises:

two magnetic dipoles with each dipole having a phase center, the magnetic dipoles being contained in orthogonal planes and having co-linear phase centers; and an electric dipole having a phase center, the electric dipole being contained in a plane which is mutually orthogonal to the planes of the magnetic dipoles, the phase center of the electric dipole being co-linear with the phase centers of the magnetic dipoles, wherein the antenna has a desired electrical efficiency which results in an external noise signal being substantially equivalent to but of greater magnitude than an internal noise signal.

20. The method of claim 19, wherein the desired efficiency of the antenna is achieved by having:

$$F_E < F_A,$$

where $F_E$ is the amount by which internal noise falls below external noise at the frequency corresponding to the received radar signal and $F_A$ is proportional to the antenna efficiency, where $$F_A = \frac{4R_L R_R}{|R_R + R_L + jX_L|^2} \text{ where,}$$

where, $R_R$ is a radiation resistance of the antenna, $R_L$ is a remaining resistance of the antenna, transmission line and/or load, and $X_L$ is a remaining reactance of the antenna and/or load.

21. The method of claim 13, wherein the receiving antenna further comprises:

three magnetic dipoles with each dipole having a phase center, the magnetic dipoles being contained in orthogonal planes and including two orthogonal horizontal magnetic dipoles and one mutually orthogonal vertical magnetic dipole; and an electric dipole having a phase center, wherein the phase centers of the magnetic dipoles and the phase center of the electric dipole are co-located, and further, wherein the antenna has a desired electrical efficiency which results in the external noise signal being substantially equivalent to but of greater magnitude than an internal noise signal.

22. The method of claim 21, wherein the desired efficiency of the antenna is achieved by having:

$$F_E < F_A,$$

where $F_E$ is the amount by which internal noise falls below external noise at the frequency corresponding to the received radar signal and $F_A$ is proportional to the antenna efficiency, where $$F_A = \frac{4 R_L R_R}{|R_R + R_L + jX_L|^2} \text{ where,}$$

where, $R_R$ is a radiation resistance of the antenna, $R_L$ is a remaining resistance of the antenna, transmission line and/or load, and $X_L$ is a remaining reactance of the antenna and/or load.

23. The method of claim 19, wherein the processing of the sampled waveform to obtain the directional information to the object further comprises:
  (1) measuring the voltages produced on each of the magnetic and electric dipoles upon reception of a vertically polarized signal;
  (2) representing the voltage measured on one of the magnetic dipoles as $S \cos \Phi$, the voltage measured on the second magnetic dipole as $S \sin \Phi$ and the voltage measured on the electric dipole as S, where S is the complex amplitude of the received signal; and
  (3) using the voltages measured on the two magnetic dipoles and the electric dipole to solve for $\Phi$, where $\Phi$ represents the azimuth angle.

24. The method of claim 21, wherein the processing of the sampled waveform to obtain the directional information to the object further comprises:
  (1) measuring the voltages produced on each of the magnetic and electric dipoles upon reception of an arbitrarily polarized signal;
  (2) representing the voltage measured on the vertical magnetic dipole as $F_h \cos \mu$, the voltage measured on the electric dipole as $F_v \cos \mu$, the voltage measured on one of the horizontal magnetic dipoles as $F_v \cos \Phi + F_h \sin \mu \sin \Phi$ and the voltage measured on the other horizontal magnetic dipole as $-Fv \sin \Phi + F_h \sin \mu \cos \Phi$, where $F_v$ is the field strength of the vertically polarized component of the received signal and $F_h$ is the field strength of the horizontally polarized component of the received signal; and
  (3) using the voltages measured on the three magnetic dipoles and the electric dipole to solve for $\Phi$ and $\mu$, where $\Phi$ represents the azimuth angle and $\mu$ represents the elevation angle.

25. The method of claim 13, wherein the generated waveform further comprises:
  a substantially linear decrease in frequency during the sweep repetition time interval, the linear decrease being performed consecutive to the linear increase in frequency, wherein the linear increase and decrease in frequency have the same sweep width.

26. The method of claim 25, wherein the processing of the sampled waveform further comprises:
  performing a Fast-Fourier-Transform on the sampled data to obtain the range and doppler or radial velocity of the object.

* * * * *